UNITED STATES PATENT OFFICE 2,625,545

STEROID-ALDEHYDE CYANOHYDRINS

Robert H. Levin and A Vern McIntosh, Jr., Kalamazoo, Mich., and Albert P. Centolella, Elkhart, Ind., assignors to The Upjohn Company, Kalamazoo, Mich., a corporation of Michigan No Drawing. Application July 18, 1949,
Serial No. 105,454

9 Claims. (Cl. 260—239.55)

The present invention relates to steroid-aldehyde cyanohydrins, and is more particularly concerned with certain steroid-aldehyde cyanohydrins of the formula:

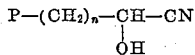

wherein P represents a steroid nucleus selected from the group consisting of pregnane, pregnene, pregnadiene, and pregnatriene, and nuclearly-substituted derivatives thereof, which is attached to the side-chain at the 20-position, and wherein $n$ is an integer from 0 to 2, inclusive.

It is an object of the present invention to provide novel steroid-aldehyde cyanohydrins. An additional object is the provision of a process for the preparation of steroid-aldehyde cyanohydrins. Other objects of the invention will become apparent hereinafter.

Members of the new group of compounds have been prepared, isolated, and found to be valuable intermediates in the preparation of more complex organic molecules, including certain hormones.

Among the aldehydes, which may be employed as suitable starting materials for the preparation of the cyanohydrins, are aldehydes, obtained from the bile acids as disclosed in co-pending applications Serial 775,956, now Patent No. 2,533,124, and 737,736, now abandoned, such as cholan-24-al, of the formula:

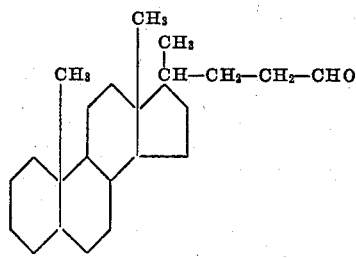

5-cholen-24-al, of the formula:

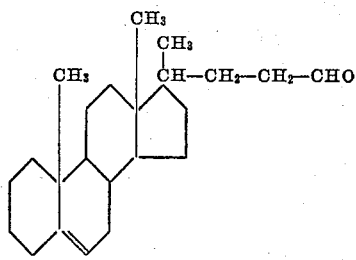

lithocholic aldehyde, desoxycholic aldehyde, and cholic aldehyde. Likewise, other unsaturated, e. g., cholene, choladiene, and cholatriene steroid aldehydes, such as 3-hydroxy-5-cholene-24-al, 3-hydroxy-6-cholene-24-al, 3-hydroxy-5,7-choladien-24-al, and 3-ester or 3-ether derivatives of the hydroxy compounds, are suitable as starting materials.

Other suitable aldehydes are those having one or two less carbon atoms in the side-chain, which are designated as noraldehydes and bisnoraldehydes, and which may have substitutents and unsaturation as described above for the cholane series. The norcholanals have the general structure:

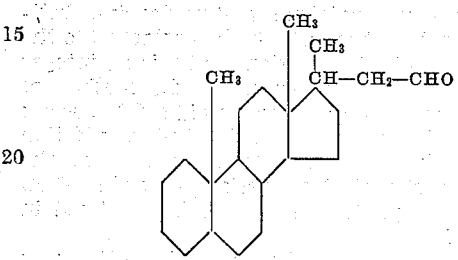

while the bisnoraldehydes have two less carbon atoms than the cholane series in the side-chain, which side-chain has the structure indicated in the formulas immediately following.

Among the bisnoraldehydes, those of particular interest as starting materials are 3-hydroxy-bisnor-5-cholene-22-al, having the structure:

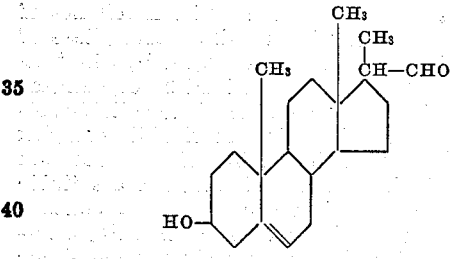

and its 3-ester and 3-ether derivatives, and 3-hydroxybisnor-5,7,9(11)-cholatrien-22-al, having the structure:

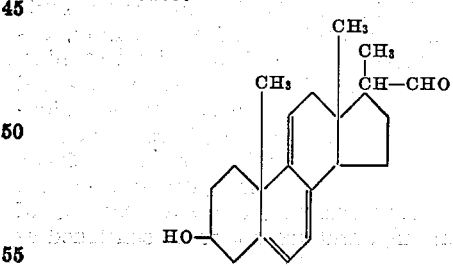

and its derivatives, in particular, its adducts with maleic anhydride, maleic acid, and esters of maleic acid, and the 3-acyl and 3-ether derivatives of these adducts.

The starting steroid aldehyde thus may be cholan-24-al, cholen-24-al, choladien-24-al, cholatrien-24-al, norcholan-23-al, norcholen-23-al, norcholadien-23-al, norcholatrien-23-al, bisnorcholatrien-24-al, bisnorcholan-22-al, bisnorcholen-22-al, or bisnorcholadien-22-al, such aldehydes having ether or ester substituents in the nucleus, maleic anhydride or maleic acid ester adducts of the nuclearly dienic aldehydes, as well as the above types of steroid aldehydes having in the molecule other nuclear substituent groups, such as i-ethers, i-esters, enol ethers, amines, double bonds protected by conversion to the halo or dihalo derivatives, halogen atoms, and the like.

Some of the various aldehydes, which are suitable as starting materials, may be prepared as described by Levin et al., J. Am. Chem. Soc. 70, 2955 (1948), or Heyl et al., ibid. 70, 2953 (1948), while the preparation of still others is described hereinafter.

In general, the starting steroid aldehydes have the formula:

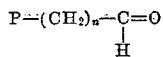

wherein P represents a steroid nucleus selected from the group consisting of pregnane, pregnene, pregnadiene, pregnatriene, and nuclearly-substituted derivatives thereof, which is attached to the side-chain at the 20-position, and $n$ is an integer from zero to two, inclusive. In the method of the present invention, these steroid aldehydes are first converted to the aldehyde bisulfite addition complex, which is then transformed into the steroid cyanohydrin by reaction therewith of an alkali metal cyanide, as more fully disclosed in the following.

The cyanohydrins of the present invention may be prepared by heating a solution of the aldehyde bisulfite addition complex and an alkali metal cyanide to from about 80 to about 100 degrees centigrade for a short time, usually from about three to ten minutes, withdrawing the heat, and allowing the mixture to stand for an additional 20 to 40 minutes. The cyanohydrin may then be isolated by adding about ten volumes of water and collecting the resulting precipitate of the cyanohydrin. The crude cyanohydrin thus obtained may be further purified by crystallization from dilute acetic acid or other suitable solvent if desired. The aldehyde bisulfite complex may be prepared by thoroughly mixing a solution of the aldehyde, which is dissolved in a suitable water-soluble organic solvent, with a concentrated aqueous solution of an alkali metal bisulfite or meta-bisulfite for a period up to about one hour, usually from 15 to 45 minutes, under room conditions.

Suitable alkali metal bisulfites and meta-bisulfites are lithium bisulfite, sodium bisulfite, potassium bisulfite, and the like. Sodium cyanide, potassium cyanide, and the like are suitable alkali metal cyanides. Suitable solvents for the aldehyde must be free from carbonyl groups and include dioxane, ethyl alcohol, ethylene glycol, ethers and esters of ethylene glycol, and the like.

The following examples are given by way of illustration only, and are not to be construed as limiting.

PREPARATION 1.—ETHYL 3-ACETOXY-5-THIOLCHOLENATE

Three grams of 3-acetoxy-5-cholenic acid was placed in a 50-milliliter side-inlet flask with 6.0 milliliters of thionyl chloride and allowed to stand for one hour with occasional shaking. Fifteen milliliters of a mixture of dry ether and benzene (1:1) was then added, and the solvent removed under reduced pressure. The addition and removal of ether-benzene was repeated three times.

Fifteen milliliters of benzene was added to the acid chloride without removal from the original flask, whereafter 0.91 milliliter of pyridine and 2.8 milliliters of ethyl mercaptan was added to the benzene solution. The reaction mixture was allowed to stand for one day at room temperature and was then rinsed into a 100-milliliter separatory funnel with 30 milliliters of ether and 30 milliliters of water. The ether-benzene solution was separated and washed with 100 milliliters of one percent aqueous sodium hydroxide and 300 milliliters of water, dried over anhydrous sodium sulfate, and evaporated to dryness under reduced pressure on a steam bath. The residual oil was dissolved in 50 milliliters of hot alcohol and 10 milliliters of water added. On cooling, 2.4 grams of ethyl 3-acetoxy-5-thiolcholenate, melting at 100 to 102 degrees centigrade, was obtained.

PREPARATION 2

In a manner essentially that described in Preparation 1, the following thiol esters were prepared and their physical properties determined.

1. Ethyl 3-alpha-acetoxythiolcholanate, melting point 97 to 102 degrees centigrade.

Calculated for $C_{28}H_{46}O_3S$—C, 72.7  H, 10.0  S, 6.93
Found ------------------ 72.85      9.98      7.30

2. Ethyl 3-alpha-hydroxythiolcholanate, melting point 81 to 82 degrees centigrade.

Calculated for $C_{26}H_{44}O_2S$—C, 74.2  H, 10.5  S, 7.62
Found ------------------ 74.0      10.1      7.22

3. Ethyl 12-alpha-acetoxythiolcholanate.

Calculated for $C_{28}H_{46}O_3S$—C, 72.7  H, 10.0  S, 6.93
Found ------------------ 72.8       9.8      7.04

4. Ethyl 3-alpha - acetoxy - 11-thiolcholenate, melting point 81 to 82.5 degrees centigrade.

Calculated for $C_{28}H_{44}O_3S$—C, 73.0  H, 9.63  S, 6.98
Found ------------------ 73.0       9.39      7.09

PREPARATION 3.—3-ALPHA-12-ALPHA-DIACETOXYNORCHOLAN-23-AL

A suspension of 30 grams of alkali-free Raney nickel catalyst in 90 milliliters of acetone was stirred and heated under reflux for one hour, whereafter 30 milliliters of water and 3.0 grams of ethyl 3-alpha-12-alpha-diacetoxynorthiolcholanate in 60 milliliters of acetone were added and heating continued for an additional hour. The hot solution was filtered, the Raney nickel washed with 50 milliliters of hot acetone, and the filtrates combined and concentrated to a small volume under reduced pressure. The precipitate was removed by filtration, dissolved in a mixture of 45 milliliters of ether and 40 milliliters of methanol, and shaken with 100 milliliters of saturated sodium bisulfite for ten minutes. Upon standing, three separate layers formed. The organic layer was removed, the aqueous phases adjusted to pH 10 with aqueous sodium carbonate, and the liberated aldehyde extracted with three 25-milliliter portions of ether. Upon evaporation of the solvent, there was obtained 1.76 grams of 3-alpha-12-alphadiacetoxynorcholan-23-al, which, when recrystallized from aqueous acetic acid and then petroleum ether, melted at 129–131 degrees centigrade.

PREPARATION 4

In a manner essentially that described in Preparation 3, the following aldehydes were prepared and characterized.

1. 3-alpha-acetoxycholan-24-al, melting point 113.5–115.5 degrees centigrade.

Calculated for $C_{26}H_{42}O_3$ _____ C, 77.6  H, 10.5
Found _____ 77.3      10.2

2. 3-alpha-hydroxycholan-24-al, melting point 146–148 degrees centigrade.

Calculated for $C_{24}H_{40}O_2$ _____ C, 79.9  H, 11.2
Found _____ 80.1      11.0

3. 12-alpha-acetoxycholan-24-al, melting point 112–115 degrees centigrade.

Calculated for $C_{26}H_{42}O_3$ _____ C, 77.6  H, 10.5
Found _____ 77.6      10.5

4. 3 - alpha - acetoxy - 11 - cholen - 24 - al, melting point 115–117.5 degrees centigrade.

Calculated for $C_{26}H_{40}O_3$ _____ C, 78.0  H, 10.1
Found _____ 77.8      10.2

5. 3 - alpha - formoxy - 5 - cholen - 24 - al, melting point 130–134 degrees centigrade.

Calculated for $C_{25}H_{38}O_3$ _____ C, 77.7  H, 9.91
Found _____ 77.6      9.97

PREPARATION 5.—MALEIC ANHYDRIDE ADDUCT OF 3-BETA - ACETOXYBISNOR-5,7,9-CHOLATRIEN-22-AL, AND ITS 2,4-DINITROPHENYLHYDRAZONE

A solution of 5.35 grams of the maleic anhydride adduct of 3 - beta - acetoxy - dehydroergosterol in 107 milliliters of methylene chloride was cooled to about minus 70 degrees centigrade and ozonized until 505 milligrams of ozone had been absorbed. The temperature of the solution was then gradually raised to about plus 10 to 15 degrees centigrade, 70 milliliters of glacial acetic acid added, and the methylene chloride removed under reduced pressure. Seven grams of zinc dust was added to the cold solution at a uniform rate over a period of ten minutes, the reaction temperature being maintained below plus 20 degrees centigrade. After stirring for 15 minutes, the mixture was filtered and the filtrate poured into water. There was thus obtained 4.31 grams of the maleic anhydride adduct of 3-beta-acetoxybisnor-5,7,9-cholatrien-22-al, a fine white powder which melted at 187–197 degrees centigrade.

To a solution of 0.30 gram of the maleic anhydride adduct of 3 - beta-acetoxybisnor - 5,7,9-cholatrien-22-al in 30 milliliters of ethanol was added 20 milliliters of alcohol containing one percent 2,4 - dinitrophenylhydrazine and three percent concentrated hydrochloric acid, the mixture allowed to stand for one hour at room temperature, and then placed in a refrigerator to complete the precipitation of the yellow crystals. The precipitate was recrystallized from a mixture of chloroform and alcohol, and the 2,4-dinitrophenylhydrazone of the maleic anhydride adduct of 3-beta-acetoxybisnor-5,7,9-cholatrien-22-al thus obtained melted at 269–271 degrees centigrade.

PREPARATION 6

In a manner essentially that described in Preparation 5, the following compounds were prepared.

1. Maleic anhydride adduct of 3-beta-formoxybisnor-5,7,9-cholatrien-22-al, melting point 95–130 degrees centigrade. 2,4-dinitrophenylhydrazone, melting point 165–168 degrees centigrade.

2. Maleic anhydride adduct of 3-beta-heptoyloxybisnor-5,7,9-cholatrien-22-al, melting point 183–193 degrees centigrade. 2,4-dinitrophenylhydrazone, melting point 253–257 degrees centigrade.

3. Dimethyl maleate adduct of 3-beta-benzoyloxybisnor-5,7,9-cholatrien-22-al, melting point 183–187 degrees centigrade. 2,4-dinitrophenylhydrazone, melting point 224–249 degrees centigrade.

4. Dimethyl maleate adduct of 3-beta-acetoxybisnor-5,7,9-cholatrien-22-al, melting point 172–178 degrees centigrade. 2,4-dinitrophenylhydrazone, melting point 238–244 degrees centigrade.

*Example 1.—3-alpha-acetoxycholan-24-al-cyanohydrin*

A mixture of 0.5 gram of 3-alpha-acetoxycholan-24-al, 1.5 milliliter of dioxane, and three milliliters of 40 percent aqueous sodium bisulfite was stirred at room temperature for 30 minutes, 0.5 gram of potassium cyanide added, and the mixture heated to about 90 degrees centigrade on a steam bath for five minutes. The resulting solution was allowed to stand for 30 minutes and poured into 50 milliliters of water. The resulting gummy precipitate was separated by decantation and crystallized from aqueous acetic acid. There was thus obtained 0.476 gram (85 percent of theory) of 3-alpha-acetoxycholan-24-al-cyanohydrin, which melted at 148–152 degrees centigrade. After several recrystallizations from aqueous acetic acid, the melting point was raised to 154.5–156 degrees centigrade.

Calculated for $C_{27}H_{43}O_3N$ _____ C 75.5  H, 10.1
Found _____ 75.5      10.0

*Example 2*

In a manner essentially the same as described in Example 1, the following cyanohydrins were prepared and their physical properties determined.

1. 3-alpha-hydroxycholan-24-al-cyanohydrin, melting point 146–149 degrees centigrade.

Calculated for $C_{25}H_{41}O_2N$ _____ C, 77.5  H, 10.7
Found _____ 77.9      10.5

2. 12-alpha-acetoxycholan-24-al-cyanohydrin, melting point 153–156 degrees centigrade.

Calculated for $C_{27}H_{43}O_3N$ _____ C, 75.5  H, 10.1
Found _____ 75.6      10.0

3. 3-alpha-12-diacetoxynorcholan-23-al-cyanohydrin, melting point 164–165.5 degrees centigrade.

Calculated for $C_{28}H_{43}O_5N$ _____ C, 71.0  H, 9.15
Found _____ 71.1      8.93

4. 3-beta-acetoxy-5-cholen-24-al-cyanohydrin, melting pont 154–157 degrees centigrade.

Calculated for $C_{27}H_{41}O_3N$ _____ C, 75.8  H, 9.67
Found _____ 76.0      9.58

5. 3 - beta - formoxy - 5-cholen-24-al-cyanohydrin, melting point 137–143 degrees centigrade.

Calculated for $C_{26}H_{39}O_2N$ _____ C, 75.5  H, 9.50
Found _____ 75.4      9.24

6. 3-alpha-acetoxy-11-cholen-24-al-cyanohydrin, melting point 162–163.5 degrees centigrade.

Calculated for $C_{27}H_{41}O_3N$ _____ C, 75.8  H, 9.67
Found _____      75.6      9.50

7. 3-methoxybisnor-5-cholen-22-al-cyanohydrin, melting point 200–205 degrees centigrade.

Calculated for $C_{24}H_{37}O_2N$ _____ C, 77.6  H, 10.0
Found _____      77.3      9.74

8. 3-acetoxybisnor 5-cholen - 22 - cyanohydrin, melting point 170–173 degrees centigrade.

Calculated for $C_{25}H_{37}O_3N$ _____ C, 75.2  H, 9.33
Found _____      74.9      9.35

9. Maleic anhydride adduct of 3-beta-acetoxybisnor-5,7,9-cholatrien-22-al-cyanohydrin, melting point 143–147 degrees centigrade.

It is to be understood that the present invention is not to be construed as limited to the exact details of operation or exact compounds shown or described, as obvious modifications and equivalents will be apparent to one skilled in the art, and the invention is therefore to be limited only as defined by the appended claims.

We claim:

1. A cyanohydrin of a steroid side-chain aldehyde, represented by the formula:

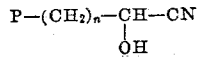

wherein P represents a steroid nucleus selected from the group consisting of pregnane, pregnene, pregnadiene, pregnatriene nuclei, which is attached to the side-chain at the 20-position, and $n$ is an integer from zero to two, inclusive.

2. A norcholan-23-al-cyanohydrin.
3. 3,12-diacetoxynorcholan-23-al-cyanohydrin.
4. A cholen-24-al-cyanohydrin.
5. 3-acetoxy-5-cholen-24-al-cyanohydrin.
6. 3-acetoxy-11-cholen-24-al-cyanohydrin.
7. A bisnorcholen-22-al-cyanohydrin.
8. 3-acetoxybisnor - 5 - cholen-22-al-cyanohydrin.
9. Maleic anhydride adduct of 3-acetoxybisnor-5,7,9-cholatrien-22-al-cyanohydrin.

ROBERT H. LEVIN.
A VERN McINTOSH, Jr.
ALBERT P. CENTOLELLA.

REFERENCES CITED

The following references are of record in the file of this patent:

UNITED STATES PATENTS

| Number | Name | Date |
| --- | --- | --- |
| 2,150,885 | Schoeller et al | Mar. 14, 1939 |
| 2,541,104 | Sarett | Feb. 13, 1951 |

OTHER REFERENCES

Migrdichian, Organic Cyanogen Compounds, 173–179 (1947).